July 28, 1925.
L. D. WOODRUFF
PIVOT TYPE UNIVERSAL BALL JOINT
Filed March 8, 1924
1,547,482
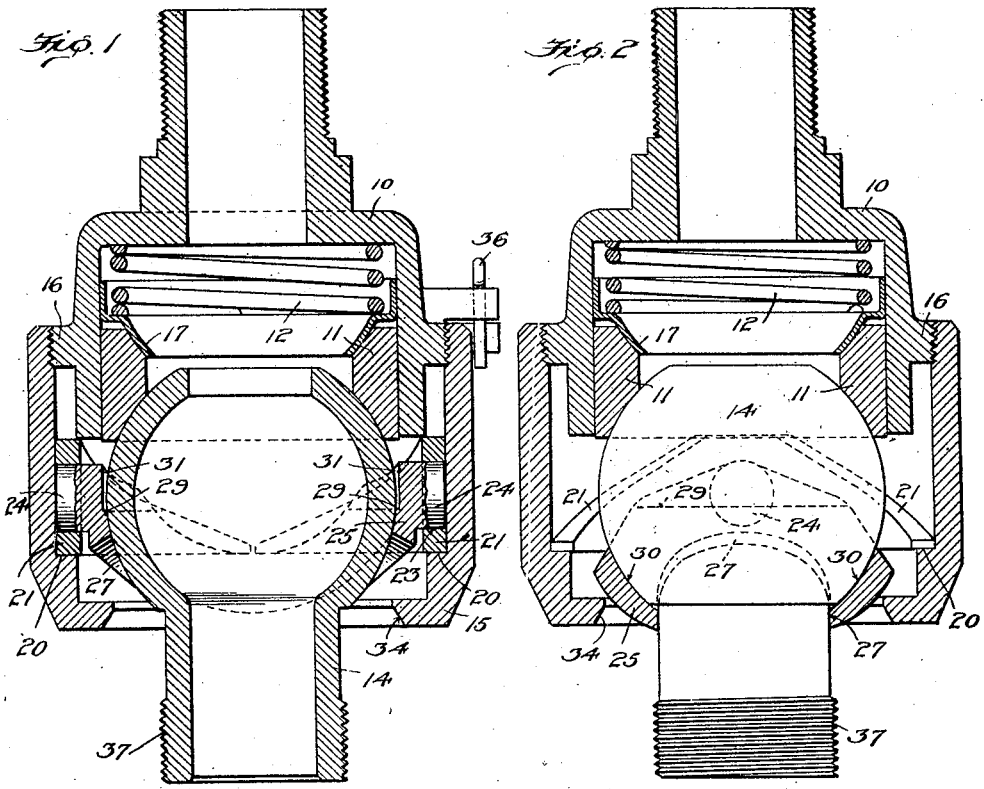
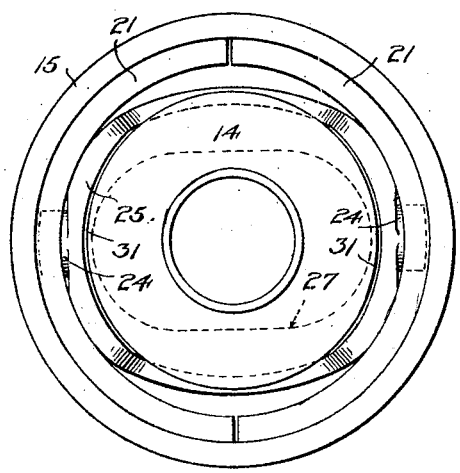
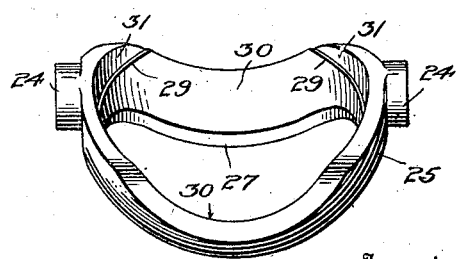
Inventor
L. D. Woodruff
By Church & Church
His Attorneys Patented July 28, 1925.

1,547,482

UNITED STATES PATENT OFFICE.

LEONIDAS D. WOODRUFF, OF CHICAGO, ILLINOIS.

PIVOT-TYPE UNIVERSAL BALL JOINT.

Application filed March 8, 1924. Serial No. 697,897.

*To all whom it may concern:*

Be it known that I, LEONIDAS D. WOODRUFF, a citizen of the United States, residing at Chicago, in the county of Cook and State of Illinois, have invented certain new and useful Improvements in Pivot-Type Universal Ball Joints; and I do hereby declare the following to be a full, clear, and exact description of the same, reference being had to the accompanying drawings, forming part of this specification.

This invention relates to ball joints for general use although the joint specifically illustrated is intended primarily for railway use, different gaskets being furnished with the joint depending upon whether the device is intended for service with steam, air or water.

The principal object of the present invention is to improve generally joints of the ball and socket variety by reducing the friction so that the ball may move more readily when the steam pressure is applied and to simplify the joint itself.

A further object of the present invention is to reduce the amount of machine work necessary and to design the joint so as to render it convenient to renew any one of the parts. By unscrewing a single set of threads the interior of the joint is accessible and any desired part may be removed except the cradle or the ball, and to remove either or both of these members only two sets of threads need be unscrewed.

Further objects of the present invention relate more particularly to the specific details which give certain advantages hereinafter specified, as for example the ease with which dust, grit and sand fall from the joint differing in this respect from all joints with which I am familiar and in which such accumulations are washed out by the condensed water passing through it.

In the drawings,—

Fig. 1 is a vertical section.

Fig. 2 is also a central vertical section but is taken at right angles to that of Fig. 1.

Fig. 3 is a plan view of the lower members of the joint.

Fig. 4 is a perspective view of the cradle.

The casing 10 and its gasket 11, held in place by a spring 12, are of a type in common use as is the ball member 14, the essential features of the present invention concerning themselves entirely with the mode of supporting the ball in the sleeve 15.

The sleeve 15 in accordance with common custom is cylindrical and is threaded at the top to receive the threaded flange 16 of the casing 10 in order to bring the ball into contact with the gasket 11 and to place the spring 12 under the desired tension. The anti-vibration ring 17 aids very materially in securing the proper action and preserving the life of the gasket 11 and, although of rather recent invention, has been found highly satisfactory.

The sleeve 15 has an annular shoulder 20 in which two freely slidable supporting members 21 are placed, these members preferably being triangular, and semi-circular in plan to fit snugly against the side of the casing with but a small space between the two supports. Each of the supports has a substantially central opening 23 which serves as a bearing for one of the trunnions 24 of the cradle 25 which is the sole supporting member for the ball. The cradle, aside from the trunnions, is generally oval having an elongated slot 27 in the bottom and in its upper portion being recessed to prevent contact with the ball, there being a consequent shoulder 29 between the cylindrical surface 30 which snugly fits the ball and the recessed portion 31, which is most readily seen in Figs. 1 and 4.

The contact surface between the ball and the cradle is entirely below the axis of the trunnions and yet perfect freedom of movement is permitted the ball within the arc defined by the beveled annular surface 34 at the bottom of the sleeve 15. Since the cradle pivots on its trunnions and the support for the trunnions swivels in the sleeve there is no possibility of the ball becoming unequally worn in ridges which occurs not infrequently in balls supported by the usual universal joint connection, the ridges being caused by hard spots in the gasket. In the present device there is no opposition to twisting of the ball and in use I find that the ball soon acquires a very smooth polished surface.

Particular attention is invited to the extreme simplicity of renewing any part of the joint. The casing and sleeve are connected together by the usual threaded connection on the periphery of the flange 16 and as usual are locked by the cotter pin 36 and the separation of these threads permit the removal of the semi-cylindrical supports 21, the spring, anti-vibration ring, or gasket, directly, and by disconnecting the ball from the pipe or other fitting secured to the threads 37 permit removal of the ball or the cradle. Except in case of serious accident the only part requiring renewal is the gasket and as seen in the drawing this is at once accessible upon separation of the casing and sleeve.

A further feature worthy of note in the present design is the lack of accuracy necessary in machining the joint or in the assembly since the center line of the ball, although preferably so, is not absolutely required to be on an exact line between the center line of the two pivots. The opening between the cradle and the casing readily permits the falling out of dust, grit and sand, there being a very considerable space between these members as best seen in Fig. 3 and in the present joint there is no occasion to wash out these accumulations due to the absence of any pocket wherein dirt or other matter could lodge.

What I claim is:

1. A ball joint of the type in which a pipe having a spherical head or ball is in communication with a second pipe having an enlargement to receive a portion of said head, a cap or sleeve detachably engaging said enlargement and surrounding a portion of said head: characterized by the provision of a pivoted cradle for said head and a rotatably mounted means providing bearings for the trunnions of said cradle.

2. A ball joint of the type in which a pipe having a spherical head or ball is in communication with a second pipe having an enlargement to receive a portion of said head, a cap or sleeve detachably engaging said enlargement and surrounding a portion of said head: characterized by the provision of a pivoted slotted cradle for said head and a rotatably mounted means providing bearings for the trunnions of said cradle, the slot of the cradle receiving the neck of the ball.

3. A ball joint of the type in which a pipe having a spherical head or ball is in communication with a second pipe having an enlargement to receive a portion of said head, a cap or sleeve detachably engaging said enlargement and surrounding a portion of said head: characterized by the provision of a pivoted slotted cradle for said head and a rotatably mounted means providing bearings for the trunnions of said cradle, the slot of the cradle receiving the neck of the ball, the cradle being recessed to prevent any contact between the ball and cradle to one side of the axis of the cradle trunnions.

4. A ball joint of the type in which a pipe having a spherical head or ball is in communication with a second pipe having an enlargement to receive a portion of said head, a cap or sleeve detachably engaging said enlargement and surrounding a portion of said head: characterized by the provision of a pivoted cradle for said head and a rotatably mounted means providing bearings for the trunnions of said cradle, said means including two semi-circular members swivelly mounted in the sleeve and each having a circular opening therethrough to receive a trunnion of the cradle.

5. In a ball joint, a casing, a sleeve detachably secured to said casing, a ball, a cradle for said ball, and means for loosely and rotatably securing said cradle within said sleeve said cradle and securing means being held against relative rotation with respect to each other while permitting the cradle to rock.

6. In a ball joint, a casing, a sleeve detachably secured to said casing and having an annular shoulder, a ball, a cradle for said ball, and means for loosely and rotatably securing said cradle within said sleeve so as to swivel about on said shoulder and to freely turn on its pivot in any angular position of the swivel said cradle and securing means being held against relative rotation with respect to each other while permitting the cradle to rock.

7. In a ball joint, a casing, a sleeve detachably secured to said casing and having an annular shoulder therein, a ball, a trunnioned cradle for said ball, a plurality of supports rotatably secured on said shoulder and each providing a journal for one of the trunnions of the cradle and resilient means carried by the casing to form a fluid tight joint with said ball.

8. A ball joint of the type having a casing and a ball pivoted in a supporting member which is in turn pivotally mounted with respect to the casing so that the ball may have universal movement; characterized by the pivotal bearings of the supporting member being movable with respect to the casings.

9. A ball joint of the type having a casing and a ball pivotd in a supporting member which is in turn pivotally mounted with respect to the casing so that the ball may have universal movement; characterized by the pivotal bearings of the supporting member being rotatable within the casings.

10. A ball joint of the type having a casing and a ball pivoted in a supporting member which is in turn pivotally mounted with respect to the casing so that the ball may have universal movement; characterized by the pivotal bearings of the supporting member being rotatable and axially movable within the casings.

11. A ball joint of the type having a casing and a ball pivoted in a supporting member which is in turn pivotally mounted with respect to the casing so that the ball may have universal movement; characterized by the provision of a swiveling ring loosely mounted in the casings and in which the supporting member is pivoted.

LEONIDAS D. WOODRUFF.